(12) United States Patent
La Rosa et al.

(10) Patent No.: US 11,862,988 B2
(45) Date of Patent: Jan. 2, 2024

(54) ENERGY HARVESTING CIRCUIT, CORRESPONDING SYSTEM AND OPERATING METHOD

(71) Applicant: STMicroelectronics S.r.l., Agrate Brianza (IT)

(72) Inventors: Roberto La Rosa, Catania (IT); Alessandro Finocchiaro, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 557 days.

(21) Appl. No.: 17/109,345

(22) Filed: Dec. 2, 2020

(65) Prior Publication Data
US 2021/0175753 A1    Jun. 10, 2021

(30) Foreign Application Priority Data
Dec. 4, 2019    (IT) .................... 102019000022950

(51) Int. Cl.
*H02J 50/27*    (2016.01)
*H02J 50/00*    (2016.01)
*H04B 5/00*    (2006.01)

(52) U.S. Cl.
CPC ............ *H02J 50/27* (2016.02); *H02J 50/001* (2020.01); *H04B 5/0037* (2013.01)

(58) Field of Classification Search
CPC ........ H02J 50/27; H02J 50/001; H04B 5/0037
(Continued)

(56) References Cited

U.S. PATENT DOCUMENTS

| 8,362,745 B2 * | 1/2013 | Tinaphong | H02J 50/27 320/108 |
| 11,626,754 B2 * | 4/2023 | Zeine | H02J 50/001 320/108 |

(Continued)

FOREIGN PATENT DOCUMENTS

| CN | 112910103 A | * | 6/2021 | ............ H02J 50/001 |
| CN | 115104234 A | * | 9/2022 | ............ H02J 50/20 |
| GB | 2494209 A | * | 3/2013 | ............ H01Q 7/06 |

OTHER PUBLICATIONS

Abouzied, Mohamed A., et al: "A fully integrated reconfigurable self-startup RF energy-harvesting system with storage capability", IEEE Journal of Solid-State Circuits, IEEE, USA, vol. 52, No. 3, Mar. 1, 2017 (Mar. 1, 2017), pp. 704-719, XP011641943.

(Continued)

*Primary Examiner* — Suresh Memula
(74) *Attorney, Agent, or Firm* — CROWE & DUNLEVY

(57) ABSTRACT

A first RF-to-DC circuit receives a radiofrequency signal and produces a first converted signal delivered to an energy storage circuit. A second RF-to-DC circuit, which is a down-scaled replica of the first RF-to-DC circuit, produces a second converted signal from the radiofrequency signal that is indicative of an open-circuit voltage of the first RF-to-DC circuit. The first RF-to-DC section includes N sub-stages, with a sub-set of sub-stages being selectively activatable. A window comparison of the second converted signal generates a first signal and a second signal indicative of whether the second converted signal is within a range of values proportional to a voltage reference signal. The sub-set of sub-stages is selectively deactivated, respectively activated, when the performed window comparison has a first result, respectively, a second result.

20 Claims, 4 Drawing Sheets

(58) Field of Classification Search
USPC .......................................................... 320/108
See application file for complete search history.

(56) References Cited

U.S. PATENT DOCUMENTS

| | | | | |
|---|---|---|---|---|
| 11,710,987 | B2* | 7/2023 | Johnston | H02J 50/60 320/108 |
| 2005/0104553 | A1* | 5/2005 | Mickle | H01Q 1/248 320/101 |
| 2013/0300358 | A1* | 11/2013 | Kirby | G06K 7/0008 320/108 |
| 2014/0266034 | A1* | 9/2014 | Lee | H02J 50/20 320/108 |
| 2015/0380973 | A1* | 12/2015 | Scheb | H02J 50/001 320/108 |
| 2016/0020631 | A1* | 1/2016 | Manova-Elssibony | H02J 50/20 307/104 |
| 2018/0183256 | A1* | 6/2018 | Tanaka | H02J 50/20 |
| 2019/0258833 | A1* | 8/2019 | Caselli | G06K 7/10148 |
| 2019/0305606 | A1 | 10/2019 | Jiang | |
| 2021/0091602 | A1* | 3/2021 | Woo | H02J 50/80 |

OTHER PUBLICATIONS

Scorcioni, S.. et al: "A 868 MHz CMOS RF-DC Power Converter With −17dBm Input Power Sensitivity and Efficiency Higher Than 40% Over 14dB Input Power Range," 2012 IEEE, pp. 109-112.
IT Search Report and Written Opinion for IT Appl. No. 102019000022950 dated Apr. 3, 2020 (8 pages).

\* cited by examiner

ENERGY HARVESTING CIRCUIT, CORRESPONDING SYSTEM AND OPERATING METHOD

PRIORITY CLAIM

This application claims the priority benefit of Italian Application for Patent No. 102019000022950, filed on Dec. 4, 2019, the content of which is hereby incorporated by reference in its entirety to the maximum extent allowable by law.

TECHNICAL FIELD

The description relates to energy harvesting.

One or more embodiments may find use in a variety of applications such as, e.g., in RF energy harvester devices such as ultra-low power (nano-Watt) RF energy harvesting applications for battery-less systems such as a wireless battery charger or a wireless sensors platform.

BACKGROUND

In energy harvesting (or, according to other designations, power harvesting or energy scavenging), energy from one or more sources such as, e.g., solar panels, wind generators, thermal generators of various types, is stored for possible use in devices such as wireless portable devices or wireless sensors (e.g., in wireless sensing platform applications).

The capability of effectively tracking the (electrical) power available in a system may be helpful in meeting the increasing demand for, e.g., wireless sensor networks (briefly, WSNs), platforms capable of collecting, processing and sharing data in wireless operation while oftentimes positioned in places which are hard to reach and service.

Specifically, WSNs for collecting and sharing data wirelessly across an Internet of Things (IoT) network may comprise sensors positioned in places hard to reach and service.

An increasing demand thus exists for energy harvesting solutions which may facilitate implementing battery-free and/or set-and-forget sensor nodes, which in turn facilitates the production of devices adapted to be virtually ubiquitous and inherently maintenance-free, e.g., for IoT (Internet of Things) applications.

Wireless Power Transfer (WPT) involves dealing with very different power conditions. In fact, depending on the distance between the Power Transmitter (PTX) and Power Receiver (PRX), the antenna orientation and the transmission channel, those systems could deal with ultra-low power or relatively higher power and, in general, with unpredictable variations of the available input power.

As exemplified in FIG. 1, an RF-to-DC converter efficiency for a power harvester, for instance operating at a frequency of 868 MHz, providing a maximum output voltage of about 2.3V, may tend to increase from zero to a maximum in a first input power range of values, remains approximately constant around the maximum in a second range of values $R_1$ and decreases from such maximum to zero in a third subsequent input power range of values $R_2$.

Existing solutions aim mainly at maximizing the circuit efficiency at a given input power level, for instance in the range of $R_1$, while neglecting degradation of power conversion as a function of input power variation issues which may reduce efficiency and output power level.

Neglecting such effects may lead to substantial energy losses which may be detrimental to the operation of applications based on energy harvesting circuits.

An approach as disclosed in Scorcioni, S. et al.: "A 868 MHz CMOS RF-DC power converter with −17 dBm input power sensitivity and efficiency higher than 40% over 14 dB input power range", 2012 Proceedings of the ESSCIRC (ESSCIRC), IEEE, 2012, p. 109-112 (incorporated by reference), discusses a CMOS RF-DC converter circuit, operating at 868 MHz, for RFID and remote powering applications, wherein the reconfigurable architecture of the converter facilitates operation of the circuit over a very wide input power range with very high efficiency.

Nevertheless, such an approach may present one or more of the following drawbacks: reconfiguration may solely be performed statically, e.g., solely during a period of time in which the input power is constant; the architecture is not automatically adaptable; and efficiency may be reduced in a period of time in which input power is varying.

Irrespective of the approach adopted, increasing the efficiency of power transfer in any operating condition is a desirable target to achieve.

There is a need in the art to providing such an improved solution.

SUMMARY

An embodiment comprises an energy harvesting circuit and, more particularly, a self-adaptive maximum power transfer energy harvesting circuit.

One or more embodiments may relate to a corresponding system.

One or more embodiments may comprise a corresponding method.

One or more embodiments may comprise an RF-to-DC transducer circuit configured to operate with a self-adaptive maximum power transfer method.

One or more embodiments may facilitate providing a dynamically optimized energy efficiency over a wide range of input power.

One or more embodiments may advantageously facilitate miniaturization, providing a harvester circuit/device with reduced dimensions. For instance, components used to perform dynamical efficiency improvement may weight solely 2% of total chip area.

One or more embodiments may improve energy harvesting systems flexibility, for instance improving circuit performance over an ample range of input power values.

One or more embodiments may suitable for use in battery-free systems, thanks to negligible power consumption levels.

One or more embodiments may facilitate increasing data update rate in wireless sensor networks powered via energy harvesting systems.

One or more embodiments may facilitate approximating real-time system performances using (non real-time) battery-free sensors, facilitating increasing data exchange rates, for instance for a Bluetooth low-energy (BLE) radio application.

One or more embodiments advantageously and innovatively facilitate a continuous flow of energy from energy harvester to RF-to-DC converter, avoiding disconnection of the harvester to measure open circuit voltage (Voc).

One or more embodiments may facilitate Ultra Low Power Energy Harvesting in the context of the Wireless Sensor Networks and IoT.

In one or more embodiments, an energy harvester circuit (and corresponding system and method) as per the present disclosure may provide a built-in reference voltage sensing circuitry, configured for performing dynamical efficiency improvement, for instance in Ultra-Low power applications.

BRIEF DESCRIPTION OF THE DRAWINGS

One or more embodiments will now be described, by way of non-limiting example only, with reference to the annexed Figures, wherein.

DETAILED DESCRIPTION

Figure 1:
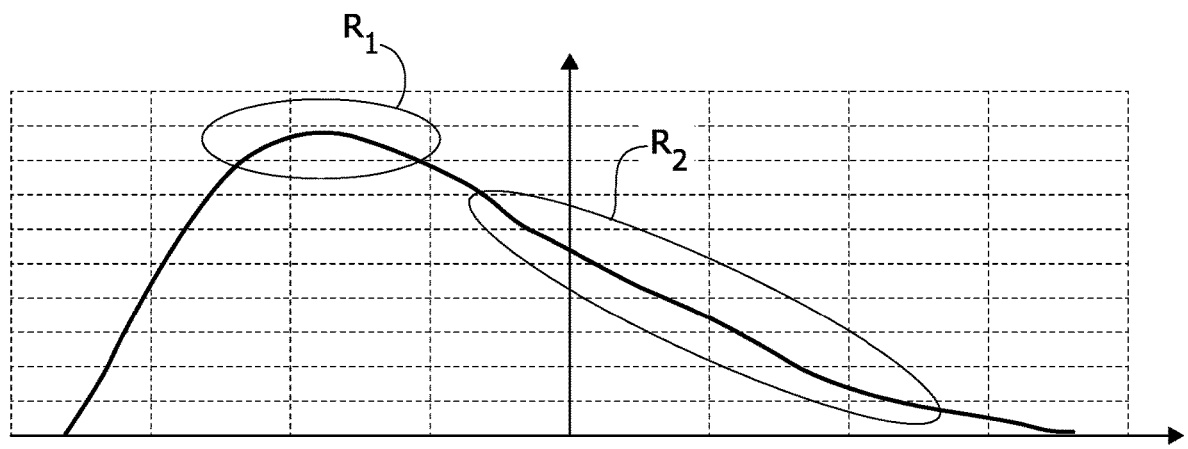
FIG. 1 illustrates an RF-to-DC converter efficiency for a power harvester.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The references used herein are provided merely for convenience and hence do not define the extent of protection or the scope of the embodiments.

The drawings are in simplified form and are not to precise scale. For the sake of simplicity, directional (up/down, etc.) or motional (forward/back, etc.) terms may be used with respect to the drawings. The term "couple" and similar terms do not necessarily denote direct and immediate connections, but also include connections through intermediate elements or devices.

One or more embodiments may exploit electromagnetic waves as a power source. For instance, one or more embodiments may be applied to a Radiofrequency (briefly, RF) energy harvester circuit.

An RF harvester as exemplified herein may rely on power extracted from RF radio waves as transmitted by a hub or base-station, for instance thanks to a converter circuit. An energy harvester as exemplified herein may thus act as a so-called Radiofrequency-to-Direct-Current (briefly, RF-to-DC) converter.

Using RF energy harvesters may be facilitated by the capability of working with (very) low power levels so as to obtain a high operating distance (r) from the power emitting source. Propagation of RF energy may be modelled by means of the Friis equation, which results in power in free space decreasing as $r^2$:

$$P_R = P_T G_T G_R (\lambda/4\pi r)^2 P_R = P_T G_T G_R (\lambda/4\pi r)^2$$

where $P_R$ is the power available at the input of the receiving antenna, $P_T$ is the output power of the transmitting antenna, $G_T$ and $G_R$ are the transmitting and receiving antenna gains, respectively, and $\lambda$ is the wavelength.

The lowest RF input power permitting the circuit to convert RF energy into DC is called sensitivity, which is a figure of merit of such circuits.

Another performance parameter is the power conversion efficiency (PCE) or simply efficiency, which is a measure of how much of the RF input power Pin is transformed into DC output power Pout, that is:

$$PCE = P_{out}/P_{in}.$$

Designing energy harvesters may thus involve: improving sensitivity with the aim of increasing the operating distance; and increasing PCE so that the output power $P_{out}$ for a same input power $P_{in}$ may be increased.

In power generation systems such as RF energy harvesters, RF-to-DC (conversion) efficiency may reach a "best" energy transfer point leading to a highest (maximum) power generation point.

The ability to adjust (quickly and precisely) the electrical operation point of the system to maximize efficient power generation may be of interest.

Circuit simplicity may be an advantageous feature of a circuit for (ultra) low-power energy harvesting, so that the energy absorbed may be reduced to a level low enough to achieve a positive balance between energy saved and energy taken in a performance improvement function.

Throughout the figures, Vin denotes an input line to an energy harvester 10 adapted to receive an input voltage $V_{in}(t)$ from an energy source—not visible in the figures. Such an energy source may be, for instance, a radiofrequency source, for instance a radiofrequency (RF) signal having a frequency of 868 MHz, which may be sensed via a receiving antenna RX.

The input voltage $V_{in}(t)$ may be expressed as:

$$V_{in}(t) = V_A \sin(\omega t)$$

where $V_A$ is the amplitude of the ac input signal, co is the angular frequency given by $\omega = 2\pi f$ and f is the operating frequency.

Figure 2:
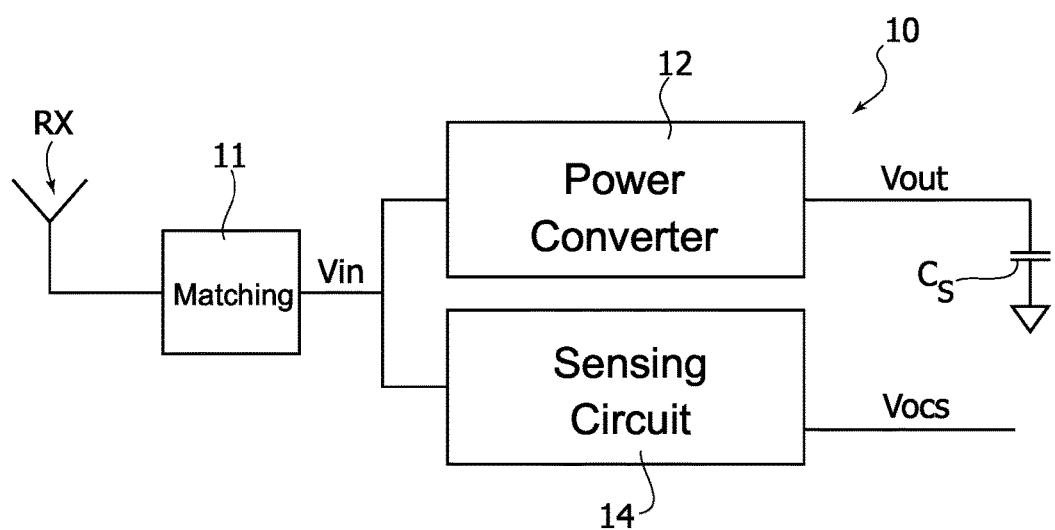
FIG. 2 is an exemplary architecture of an RF-to-DC converter circuit as per the present disclosure.

In one or more embodiments as exemplified in FIG. 2, a matching network 11 may facilitate coupling the antenna RX to the harvester circuit 10, facilitating to provide the sensed signal Vin at an input node Vin of the energy harvester.

As exemplified in FIG. 2, such an energy harvester circuit 10 may comprise two circuit portions: a power converter circuit section 12 comprising a first radiofrequency-to-direct-current, RF-to-DC, converter circuit 12 coupled to the input node Vin and configured to receive the input signal Vin therefrom and to apply RF-to-DC conversion processing thereto, producing a converted signal at an output node Vout; and an energy storage circuit section $C_s$ coupled to the output node Vout of the first RF-to-DC converter circuit 12 and configured to be supplied with the converted signal Vout therefrom, for instance a capacitor $C_s$ configured to store energy harvested by the harvester circuit 10; and a sensing circuit section 14 comprising a second RF-to-DC converter circuit 14 comprising a down-sized replica of the first circuit section 12, wherein the second RF-to-DC converter circuit 14 is configured to receive the first signal at the input node Vin and to produce, at a sensing node Vocs, a scaled converted signal indicative of an open-circuit voltage of the first RF-to-DC circuit section 12.

One or more embodiments of such an energy harvesting circuit 10 are discussed in U.S. application for patent Ser. No. 16/849,370 (based on Italian Patent Application n. 102019000006086 filed on Apr. 18, 2019), incorporated by reference.

In one or more embodiments, the Voc (open circuit voltage) sensing section 14 may correspond to a sort of "miniaturized" scaled-down replica of the power section 12 and provide a measure proportional to the open-circuit voltage Voc (e.g., referred to as Vocs) at a corresponding output node Vocs.

In one or more embodiments, the power section 12 may take the higher percentage of the volume/area of the whole device 10 and act as the energy generator.

For instance, the sensing section 14 may be a sort of a scaled version, e.g., shrunk in area, of the power section 12 and which is devoted to measuring the open-circuit voltage Voc.

One or more embodiments may use the second RF-to-DC section 14 as a small "dummy" RF-to-DC cell configured to reproduce the behavior of the "main" RF-to-DC system, with the dummy cell capable of providing, e.g., a measure of the open circuit voltage of the main system which in turn can be used to perform a dynamical system efficiency improvement function.

Consequently, the volume/area of the sensing section 14 may be (much) smaller and almost negligible with respect to the volume/area of the power section 12.

In the case of a power section 12 dimensioned to provide 1 μA, this would result in a 1/10 area ratio, that is a scaling factor equal to 10.

In one or more embodiments, the ratio of the volume/area of the sensing section 14 to the volume/area of the power section 12 will be the (only) source of power inefficiency of the arrangement.

For instance, with a proper design of the device 10, this inefficiency can be reduced to a minimum, (well) below inefficiency level of conventional solutions.

A further increase in energy efficiency may derive from the continuous flow of energy from the device 10 to the converter, e.g., due to the possibility of avoiding disconnection in order to measure the Voc voltage.

Also, the possibility of reducing the size of the system as a whole (system miniaturization) will have a synergistic effect insofar as the additional volume/area taken by the device 14 will be (largely) compensated by the increase in energy efficiency.

In one or more embodiments, as a result, a Volume/Area ratio of the second portion 14 circuitry may be much lower or better negligible with respect to a Volume/Area ratio of the power section 12.

In one or more embodiments as exemplified in FIG. 2: the first RF-to-DC of the power section 12 may comprise a first set of N (voltage) converter circuit sub-stages, for instance a set of N multiplier stages, providing a first (for instance, maximum) conversion factor N, for instance N=4, wherein a number of stages Ns in the first converter circuit sub-stages N may be selectively activatable, for instance to provide a certain conversion factor, as discussed in the following; and the second RF-to-DC in the sensing section 14 may comprise a second set of M (voltage) converter circuit sub-stages, for instance a set of M=N/2 multiplier stages, providing a second (for instance, scaled) conversion factor M, for instance M=N/2=2 when N=4.

In one or more embodiments, the ratio between the first multiplication factor and the second multiplication factor may advantageously be of one half, hence providing a reference of half of the open-voltage Voc, e.g., Vocs=Voc/M=Voc/2.

The power delivered to a generic load by a Radiofrequency-to-Direct Current (briefly, RF-to-DC) energy converter is dependent on its internal impedance. In particular, Maximum Power Transfer happens if there is a matching between an internal electrical resistance Rs of a RF-to-DC device and a load Rs.

RF-to-DC converter circuits convert RF energy into DC electricity proportionally to the (input) power received at the antenna. For instance, the (output) power provided may be expressed as:

$$Pout=(-Vout^2+Vout*Voc)/Rs$$

where: Voc is the open circuit output voltage of the RF-to-DC circuit, and Rs is the internal electric resistance of the RF-to-DC. Output power provided by the RF-to-DC circuit versus the output voltage is a parabola having a maximum at the output voltage Vout=Voc/2 which is in turn the same condition obtained by having Rs=RL.

This poses a relevant issue during the design phase. The RF-to-DC internal impedance Rs depends on the received power. Hence, in the design phase the power transfer can solely be optimized for a single predefined received power and load condition.

Such a condition hardly matches with a real-life situation: in fact, for a defined transmitted power and frequency, in a Wireless Power Transfer, the received power depends very much on the environmental conditions and the distance between the power receiver and transmitter. In general, the received power at the input of the RF-to-DC circuit cannot be considered fixed, as well the load condition is very variable during the power transfer.

The system may hence lose efficiency while the relative distance between Power Transmitter and Power Receiver varies or if the environmental conditions changes, as usually happens in practice.

Figure 3:
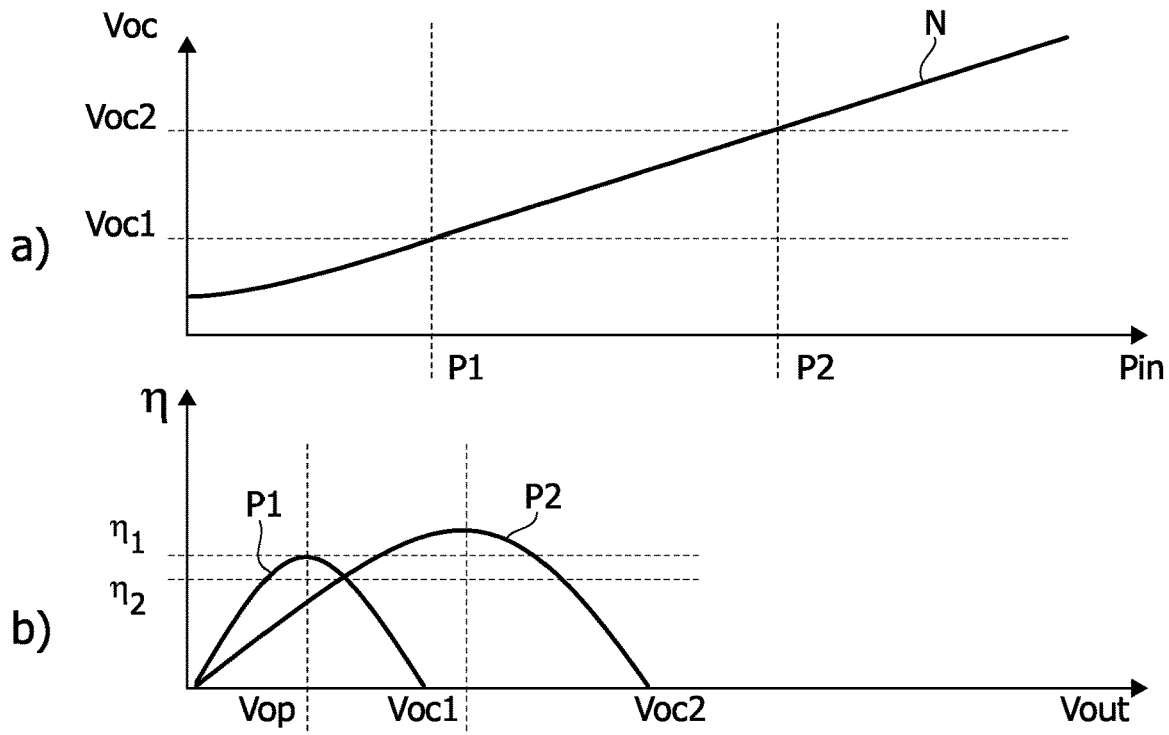
FIGS. 3, 4 and 5 are diagrams illustrating principles underlying a solution as per the present disclosure.

FIG. 3 comprises diagrams exemplary of principles underlying embodiments of the energy harvesting circuit 10 as exemplified in FIG. 2.

In one or more embodiments, an open-circuit voltage Voc of the first RF-to-DC section 12 of the circuit 10 may vary with respect to input power Pin sensed via at least one antenna RX in an almost linearly growing way, as represented in as exemplified in portion a) of FIG. 3.

For instance, a trend of such a quasi-linear curve may be proportional to a number N of sub-stages in the first RF-to-DC circuit section 12.

In such a considered example: when the input power level Pin has a first power value P1, the open-circuit voltage level Voc has a first voltage value Voc1, wherein such values are coordinate value of such a first operating point of the first RF-to-DC circuit section 12 in the Voc-Pin diagram as exemplified in portion a) of FIG. 3; and when the input power level Pin has a second power value P2 higher than the first power value P1, the open-circuit voltage level Voc has a second voltage value Voc2 higher than the first voltage value Voc1, wherein such values are coordinate value of such a second operating point of the first RF-to-DC circuit section 12 in the Voc-Pin diagram as exemplified in portion a) of FIG. 3.

In one or more embodiments as exemplified in portion b) of FIG. 3, an output power Pout vs. output voltage Vout relationship exhibits a substantially (inverted; concave, downwardly facing concavity) parabolic trend with a peak value at Vout=Voc/2, wherein an operative voltage value Vop at which the circuit 10 is optimized to operate in the design stage is often equal to such a peak value Vout in the expected working conditions, for instance Vout=Voc1/2.

In the example considered, following from what discussed with respect to portion a) of FIG. 3, it follows that, as exemplified in portion b) of FIG. 3: when the input power level Pin has a first power value P1, the peak output voltage value is equal to the operative voltage Vop and the circuit has a first efficiency value η1; and when the input power level Pin has a second power value P2 higher than the first power value P1, the operative voltage value may be far from the peak output voltage value, as exemplified in portion b) of FIG. 3, leading to the circuit having a second efficiency value η2 lower than the first efficiency value η1.

A solution according to the present disclosure, provides a method to reconfigure the number of converting sub-stages Ns which may be activated to operate the RF-to-DC conversion in the first RF-to-DC section 12 so as to solve the problem of loss of efficiency. This may facilitate to avoid wasting positive variations of input power which may arise, for instance, by a reduction of distance between the RF energy source and the sensing antenna RX.

This suggests that, in order to facilitate achieving an optimum power transfer, the RF-to-DC cell should desirably be conditioned in order to operate within a voltage range arranged in the vicinity of Voc/2. Facilitating measuring the open-circuit voltage value Voc may hence be helpful.

Figure 4:
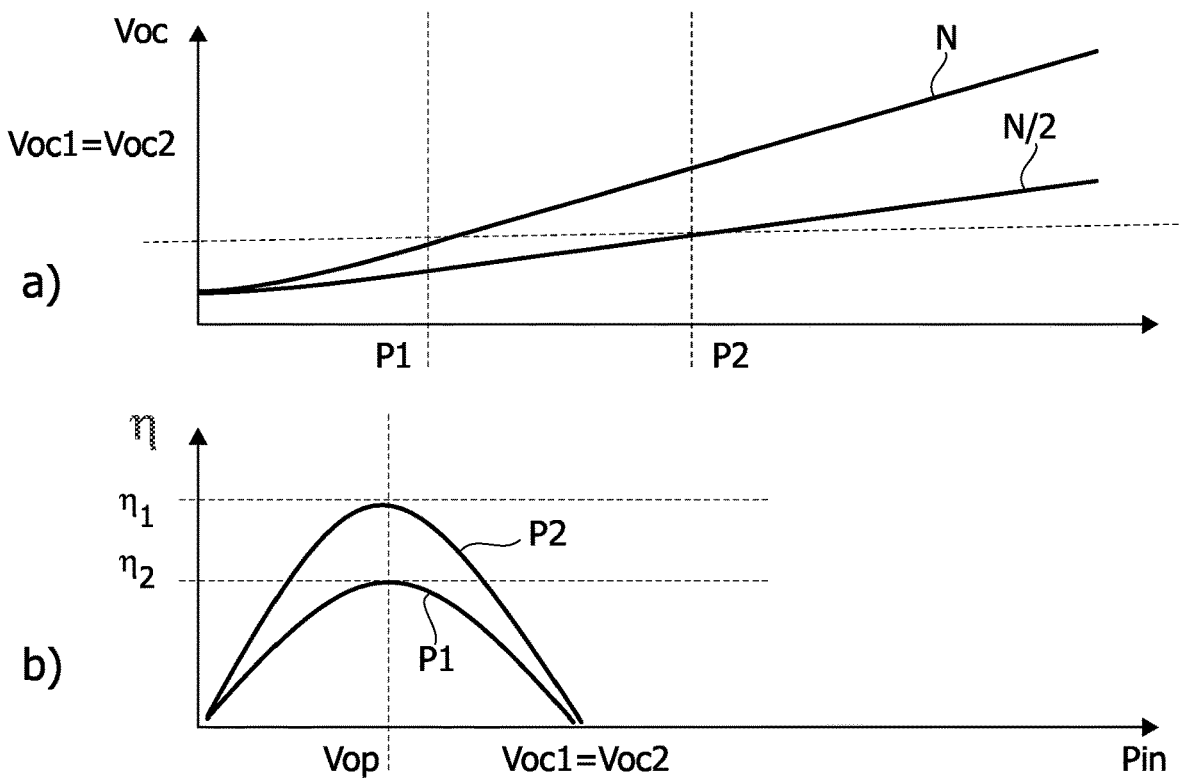

FIG. 4 comprises diagrams exemplary of principles underlying embodiments of the energy harvesting circuit 10 as exemplified in FIG. 2.

In the following, unless otherwise specified, like references may be used to indicate like elements.

In one or more embodiments as exemplified in FIG. 4, it is observed that the dependency of the trend of the curve between open-circuit voltage Voc of the first RF-to-DC section 12 of the circuit 10 and the input power Pin sensed via the at least one antenna RX from the number of activated sub-stages Ns in the set of N sub-stages of the first RF-to-DC section 12 of the circuit 10 may be exploited to improve system efficiency.

For instance, consider the following scenario in which: until the input power has a first power value P1, all N sub-stages of the first RF-to-DC section 12 of the circuit 10 operate the conversion of the received signal Vin to the converted signal Vout, wherein the circuit section 12 with all N sub-stages activated has an first open-circuit voltage Voc1 (detectable thanks to the second RF-to-DC converter 14); and when the input power increases, reaching a second power value P2 higher than the first power value P1, a reduced number Ns, for instance Ns=N/2, of all N sub-stages of the first RF-to-DC section 12 are selectively activated, wherein as a result of the number of active substages being Ns, wherein the second open circuit voltage Voc2 (detectable thanks to the second RF-to-DC converter 14) may be equal to the first open-circuit voltage Voc1 as a result as exemplified in portion a) of FIG. 4.

In such a considered example: when the input power level Pin has a first power value P1, the open-circuit voltage level Voc has a first voltage value Voc1, wherein such values are coordinate value of such a first operating point of the first RF-to-DC circuit section 12 in the Voc-Pin diagram as exemplified in portion a) of FIG. 4; and when the input power level Pin has a second power value P2 higher than the first power value P1, the open-circuit voltage level Voc has a second voltage value Voc2 equal to the first voltage value Voc1, wherein such values are coordinate value of such a second operating point of the first RF-to-DC circuit section 12 in the Voc-Pin diagram as exemplified in portion a) of FIG. 4.

In one or more embodiments as exemplified in portion b) of FIG. 4, the peak value at Vout=Voc/2 remains constant throughout different input-power value ranges, so that the operative voltage value Vop at which the circuit 10 is optimized to operate in the design stage remains the one of the working conditions expected by design, for instance Vout=Voc1/2=Voc2/2=Vop.

In the example considered, following from what discussed with respect to portion a) of FIG. 4, it follows that, as exemplified in portion b) of FIG. 4: when the input power level Pin has the first power value P1, the peak output voltage value is equal to the operative voltage Vop and the circuit has a first efficiency value 111 as exemplified in portion b) of FIG. 3; and when the input power level Pin has a second power value P2 higher than the first power value P1, the operative voltage value remains close or equal to the peak output voltage value Vop.

As a result, the circuit 10 operated in such a way shows an improved performance, adjustability and flexibility, without loss of efficiency in terms of energy conversion.

Figure 5:
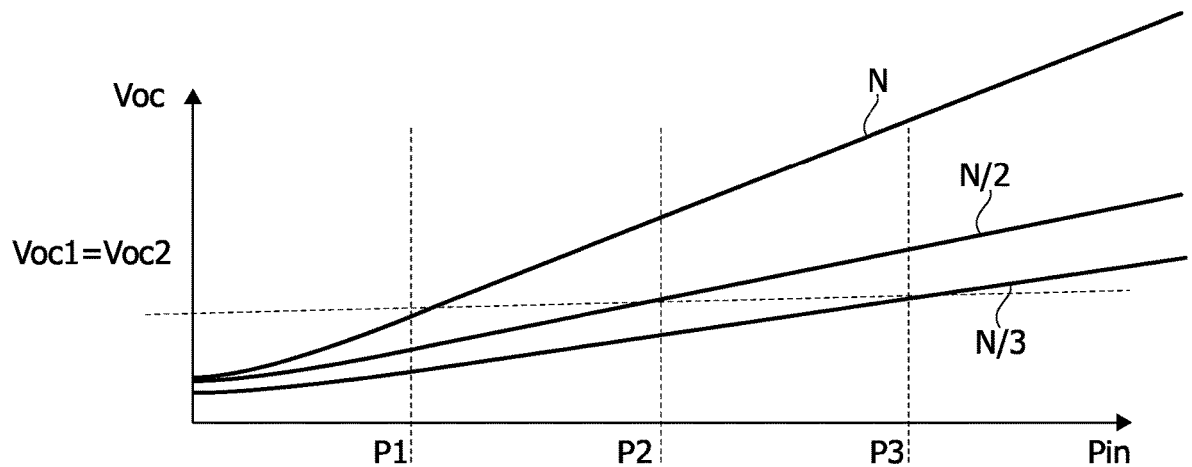

FIG. 5 is a further exemplary diagram of principles underlying embodiments, wherein the number of active stages may be varied in a plurality of operating conditions, for instance: until the input power has a first power value P1, all N sub-stages of the first RF-to-DC section 12 of the circuit 10 operate the conversion of the received signal Vin to the converted signal Vout, wherein the circuit section 12 with all N sub-stages activated has an first open-circuit voltage Voc1 (detectable thanks to the second RF-to-DC converter 14); when the input power increases, reaching a second power value P2 higher than the first power value P1, a reduced number Ns, for instance Ns=N/2, of all N sub-stages of the first RF-to-DC section 12 are selectively activated, wherein as a result of the number of active substages being Ns, wherein the second open circuit voltage Voc2 (detectable thanks to the second RF-to-DC converter 14) may be equal to the first open-circuit voltage Voc1 as a result; and when the input power further increases, reaching a third power value P3 higher than both the first power value P1 and the second power value P2, a further reduced number, for instance N/3, of all N sub-stages of the first RF-to-DC section 12 are selectively activated, wherein as a result of the number of active substages being reduced to N/3, a third open circuit voltage Voc3=Voc1=Voc2 (detectable thanks to the second RF-to-DC converter 14) may be equal to the first open-circuit voltage Voc1.

Figure 6:
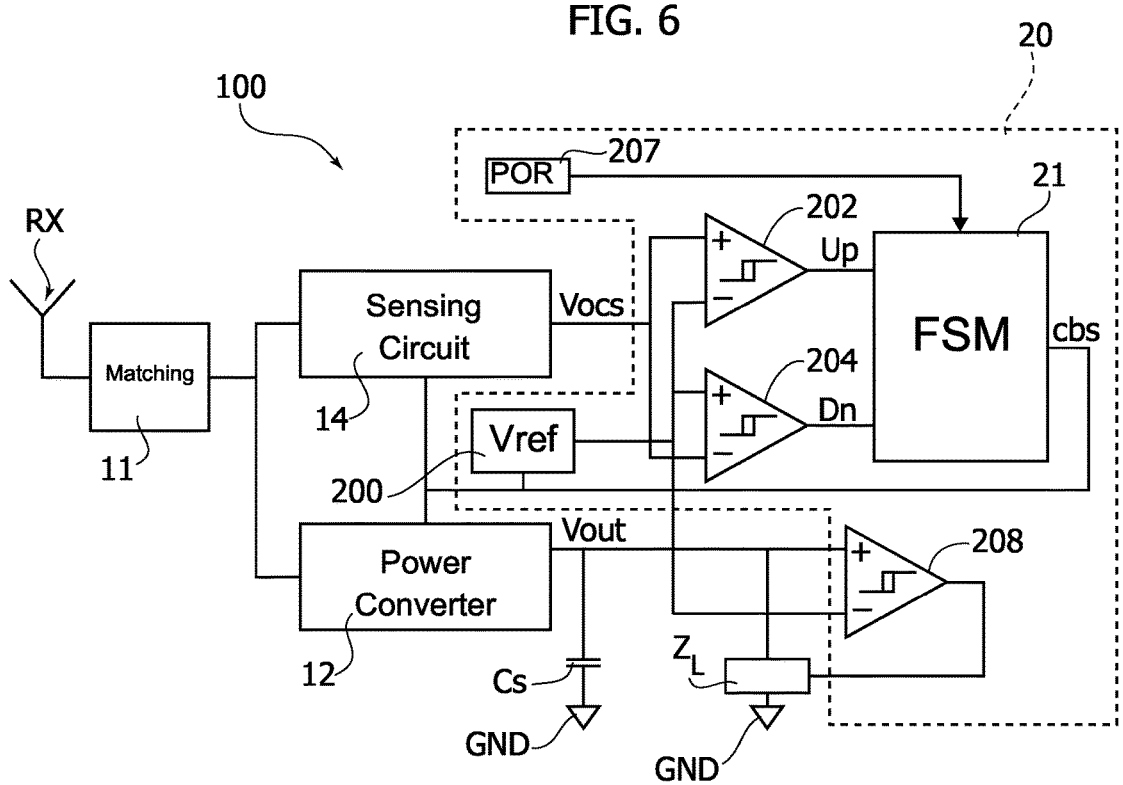
FIG. 6 is an exemplary architecture of an RF-to-DC converter circuit which may be reconfigurable as per the present disclosure.

In one or more embodiments as exemplified in FIG. 6, a configurable energy harvesting circuit 100 as per the present disclosure may comprise: a harvester circuit 10, as discussed in the foregoing. The circuit 100 also includes a driver circuitry 20 coupled to said first and second RF-to-DC sections 12, 14, the driver circuitry comprising a voltage reference (Vref) circuit section 200 and configured to receive said sensing signal Vocs from said second RF-to-DC section 14 and to selectively activate/deactivate a number Ns of sub-stages in the set of sub-stages of the first RF-to-DC section 12. A load stage $Z_L$ comprising a load impedance element is coupled between the first voltage node Vout of the first RF-to-DC converter and ground GND.

In one or more embodiments, the driver circuitry 20 may comprise: the voltage reference section 200 formed, for instance, by a voltage reference generator, for instance a low-dropout (LDO) voltage regulator, the generator 200 configured to provide a voltage operative level at a respective voltage reference node Vop, for instance the voltage operative level at which the operation of the first RF-to-DC is designed to optimally function. The driver circuitry 20 further includes a window comparator stage 202, 204 configured to determine whether the open-circuit voltage sensed Vocs at the sensing node Vocs of the second RF-to-DC is above or below the reference voltage level threshold, wherein the comparator 202, 204 is configured to output at a respective first node Up a first binary signal Up which may have a first value, for instance a "logical high" or "1", if Vocs is greater than a threshold value, e.g. Vocs>Vop, or a second value, for instance a "logical low" or "0", if Vocs is lower or equal than the threshold value, e.g. Vocs<Vop, and, at a respective second node Dn, a second binary signal Dn which may have a first value, for instance a "logical high" or "1", if Vocs is lower than a threshold value, e.g. Vocs>>Vop, or a second value, for instance a "logical low" or "0", if Vocs is greater or equal than the threshold value, e.g. Vocs<Vop. A finite state machine (FSM) stage 21, preferably an asynchronous FSM, is coupled to said window comparator and configured to receive the first and second binary signals Up, Dn and to apply FSM processing thereto, producing a control signal cbs (for instance, a control bit sequence) which may be provided to the first RF-to-DC conversion stage, wherein the control signal cbs is configured to selectively activate/deactivate the set of sub-stages Ns in all N substages of the first RF-to-DC section 12.

In one or more embodiments, employing an asynchronous FSM 21 may facilitate reducing power losses with respect to employing a synchronous FSM 21, the first advantageously avoiding the employ of a power consuming clock generator.

In one or more embodiments, as discussed in the following, the control signal cbs may be a two-bit (or n-bit) signal whose value may be a function of an operational state of the FSM stage 21 and of the binary signals Up, Dn input thereto, for instance cbs may be computed as a summation of binary signals Up, Dn.

In one or more embodiments, the window comparator 202, 204 may comprise: i) a first "over-voltage" comparator circuit 202, e.g. a hysteresis comparator, having a first "positive" input node coupled to the sensing node Vocs of the second RF-to-DC section 12 and configured to receive the (scaled) sensed open-circuit voltage level Vocs therefrom, the first comparator stage 202 having a second "negative" input node coupled to the reference voltage node Vop and configured to receive the voltage reference level Vop therefrom; and ii) a second "under-voltage" comparator circuit 204, e.g. a hysteresis comparator, having a first "negative" input node coupled to the sensing node Vocs of the second RF-to-DC section 12 and configured to receive the (scaled) sensed open-circuit voltage level Vocs therefrom, the first comparator stage 202 having a second "positive" input node coupled to the reference voltage node Vop and configured to receive the voltage reference level Vop therefrom. Each of the first and second comparator circuits 202, 204 detects the common input voltage Vocs against reference voltages ±Vocs as upper and lower limits.

In one or more embodiments, the driver circuitry 21 may comprise a power on reset (POR) circuit section 207 coupled to the FSM circuit 21 and configured to reset an operational state of the FSM, as discussed in the following.

One or more embodiments may optionally comprise a further comparator circuit 208 having a first "positive" node coupled to the output node of the first RF-to-DC section 12 and configured to receive the first output voltage Vout therefrom and having a second "negative" input node coupled to the reference generator 200 and configured to receive the voltage reference level Vop therefrom, the further comparator 208 being coupled to the load stage $Z_L$ and configured to control the load $Z_L$, for instance controlling an activation status of the load as a function of the output voltage being proportional to the operative voltage Vop.

In one or more embodiments, the further comparator 208 may comprise a simple (low-cost) ultra-low-power comparator which may condition the voltage stored at $C_L$ in order to facilitate its average to approximate the operative voltage value Vop voltage in various environmental conditions, as discussed in the following (see, for instance, FIG. 8).

Figure 7:
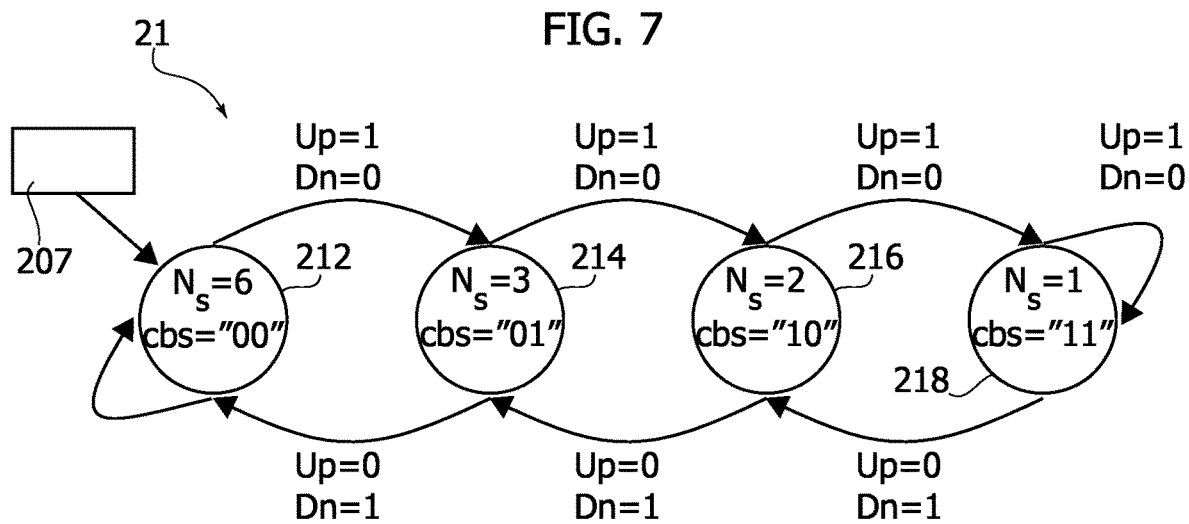
FIG. 7 is an exemplary diagram of a method as per the present disclosure.

FIG. 7 is an exemplary state diagram of possible functioning of the FSM circuit 21 in one or more embodiments.

Considering an exemplary scenario, wherein the first RF-to-DC section 12 comprises a number of N=6 sub-stages and wherein the second RF-to-DC section 14 comprises M=N/2=3 sub-stages, as exemplified in FIG. 7, for instance: a POR signal may be sent by the POR stage 207 to the FSM stage 21, initializing it to a start state 212.

In the start state 212, as long as the open-circuit voltage Vocs sensed at the sensing node Vocs of the second RF-to-DC section 14 is within a first interval ±Vop, which may be indicative of the input power level condition Pin=P1, the control signal cbs may have a start value, for instance cbs="00" which may selectively activate the maximum number Ns of substages in the first RF-to-DC section 12, for instance Ns=N=6.

The FSM 21 may envisage a first transition from the start state 212 to a first state 214, wherein the first transition may be triggered as a result of an increase of the value of the open-circuit voltage Vocs sensed at the sensing node Vocs of the second RF-to-DC section 14, for instance Vocs=Voc2>Vop, wherein such an increase condition may be detected as a result of the comparator 212, 214 outputting a signal Up having the first value, for instance when Up="1", which may be indicative of the input power level condition Pin=P2. In the first state 214, the control signal cbs may have a first value, for instance cbs="01", and a reduced (for instance, halved) number of substages may be activated/deactivated as a result, for instance Ns=N/2=3.

The FSM 21 may further have a second transition from the first state 214 to a second state 216, wherein the second transition may be triggered as a result of a further increase of the value of the open-circuit voltage Vocs sensed at the sensing node Vocs of the second RF-to-DC section 14, for instance Vocs=Voc3>Vop, wherein such an increase condition may be detected as a result of the comparator 212, 214 outputting a signal Up having the first value, for instance when Up="1", while the system is in the first state 214, which may be indicative of the input power level condition Pin=P3. In the second state 216, the control signal cbs may have a second value, for instance cbs="10", and a reduced (for instance, one-third of the total) number of substages Ns may be activated/deactivated as a result, for instance Ns=N/3=2.

The FSM 21 may further transition from the second state 216 to a third state 218, wherein the further transition may be triggered as a result of another increase of the value of the open-circuit voltage Vocs sensed at the sensing node Vocs of the second RF-to-DC section 14, wherein such an increase condition may be detected as a result of the comparator 212, 214 outputting another signal Up having the first value, for instance when Up="1", while the system is in the third state 216, which may be indicative of the input power level condition Pin>P3. In the third state 218, the control signal cbs may have a third value, for instance cbs="11", and a reduced (for instance, one-sixth of the total) number of substages Ns may be activated/deactivated as a result, for instance Ns=N/6=1.

In one or more embodiments, while in any of the states 212, 214, 216, 218, the FSM 21 may envisage opposed transitions going in an opposite direction with respect to what discussed in the foregoing, as a result of the comparator 212, 214 outputting a signal Dn having the first value, for instance when Dn="1", while the system is any of the state 212, 214, 216, 218, causing a change in the control signal value, for instance from cbs="11" to cbs="10", which may be indicative of the input power level condition Pin<=P3.

Figure 8:
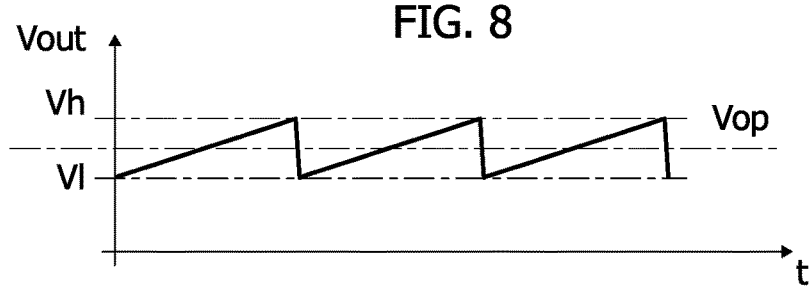
FIG. 8 is an exemplary diagram of possible voltage signals in one or more embodiments.

In one or more embodiments as exemplified in FIG. 8, for instance in a steady-state condition, the voltage Vout provided by the first RF-to-DC section 12 and stored on the element $C_L$ may toggle between two voltages Vh and Vl.

For instance, as a result of Vout reaching an (upper) voltage Vh, a transfer mechanism of the energy stored at 16 can be activated towards a load $Z_L$ (see the right-hand side of FIG. 6), which per se may be distinct from the embodiments, e.g., an IoT node, with the load $Z_L$ coupled to an output node 18c of the third comparator 208.

In one or more embodiments as exemplified in FIG. 2, energy transfer towards the load $Z_L$ may be, e.g., via a DC-DC converter (which per se may be of a conventional, simplified design) controlled via a signal output by the third comparator 208. As a result of energy being transferred to the load, the voltage Vout may drop from an upper value Vh (see again the diagram of FIG. 8) to a lower value Vl, with the DC-DC converter turned off (energy transfer discontinued), thereby facilitating renewed storage of energy until the upper value Vh is reached again.

As mentioned, in one or more embodiments voltage drop from Vh to Vl may be limited, e.g., in such a way that the average of voltage Vout may approximate the "desired" operative voltage Vop, advantageously providing dynamically improved energy conversion efficiency.

As exemplified in FIG. 8, the system may alternate between a charge phase and a discharge phase with a frequency proportional to the input power. For instance, the higher the input power, the shorter the charge phase period, leading to a higher commutation frequency. In battery-free sensor applications, for instance such as BLE radio, data is transmitted whenever a discharge phase is initiated, the higher the commutation frequency between charge/discharge phases, the higher the data transmission rate may advantageously be increased.

One or more embodiments may advantageously increase the amount of data which may be transmitted, for a given amount of input power, by a sensor powered with a harvester as per the present disclosure, facilitating approximating real-time systems data rates.

For instance, for a given circuit 10, Vh and Vl can be selected so that Vh=Voc/2+ΔV and Vl=Voc/2−ΔV with (Vh+Vl)/2=Voc, with ΔV selected in such a way that power loss with respect to the highest value is maintained within a desired range (e.g., 90%).

In one or more embodiments as exemplified in FIG. 6, the FSM stage 21 may be coupled to the voltage reference source 200 and may be configured for controllably varying its value in order to compensate for possible non-linearities which may arise in Pout-Vout curves of the circuit 10 with very high levels of input power Pin.

Figure 9:
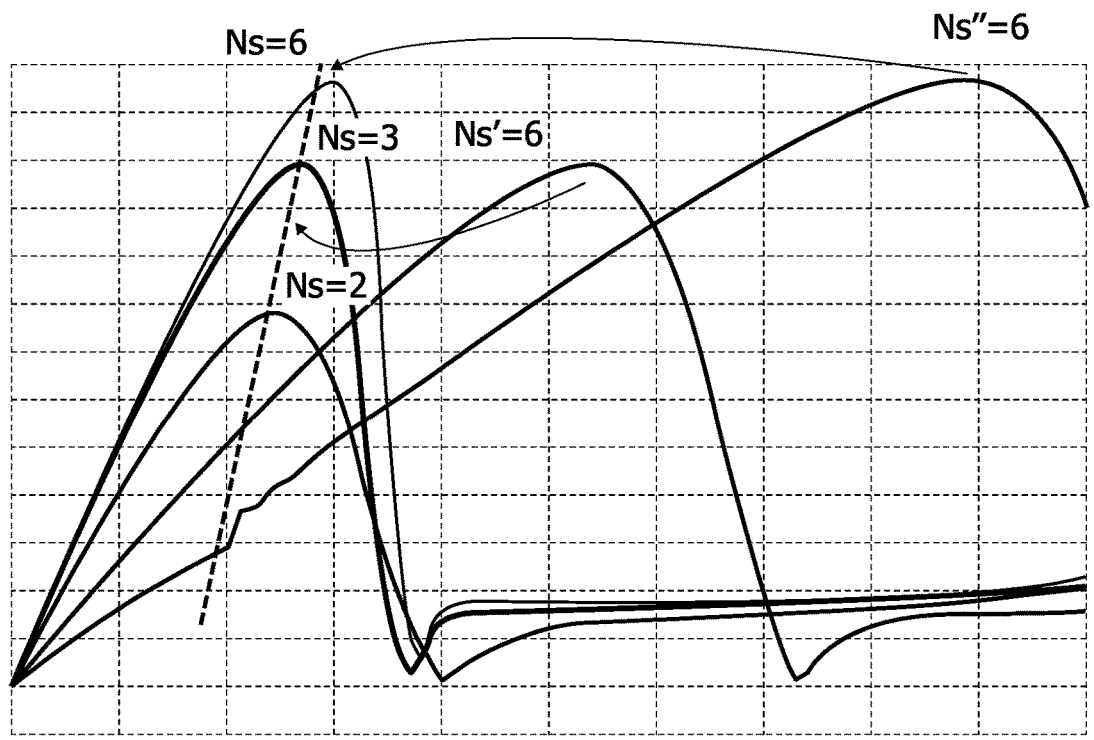
FIG. 9 is an exemplary diagram of possible power signals in one or more embodiments.

FIG. 9 is an exemplary diagram of such non-linearities.

For instance, when the input power Pin is much higher than P3, it may be convenient to raise or lower the value of Vop to facilitate selecting a condition which may lead to conserving a possibly highest efficiency value, e.g., a first Vop' may be set for Ns'=6, respectively, Ns"=6, without varying the reference voltage generator level if the input power Pin is average or much higher than P3, respectively.

For instance, when the input power Pin is much higher than P3, it may be convenient to further scale down also the down-sized version 14 of the first RF-to-DC converter, in order to facilitate selecting a condition which may lead to conserving a possibly highest efficiency value.

In one or more embodiments, a limited range of power values may be set for the system to operate within. For instance, the range may comprise an upper and a lower limiting values, wherein the lower value may be determined as a function of the maximum number N of sub-stages, which may contribute to improving device sensitivity, while the upper limit may be determined as a function of a "minimum" number of substages which may be active at the same time.

In one or more embodiments, an electrically powered system, optionally battery-less electrically powered system (e.g., a mobile RF terminal or a wireless sensor comprising at least one RF sensing antenna RX) may include an energy harvester circuit 10 as exemplified herein, for instance as a source of electrical power supply.

As exemplified herein, an energy harvester circuit (for instance, 100) may comprise: a first radiofrequency-to-direct current, RF-to-DC, circuit section (for instance, 12) configured to receive a first signal from at least one radiofrequency sensing antenna (for instance, RX) at a first node (for instance, Vin) and to produce a first converted signal at a second node (for instance, Vout); an energy storage circuit section (for instance, CO coupled to the first RF-to-DC section and supplied with the converted signal therefrom; a second RF-to-DC circuit section (for instance, 14) comprising a down-scaled replica of the first RF-to-DC section and configured to receive said first converted signal at said input node and to produce, at a sensing node (for instance, Vocs), a second converted signal indicative of an open-circuit voltage of the first RF-to-DC circuit section; driver circuitry (for instance, 20) comprising a voltage reference generator (for instance, 200) configured to provide a voltage reference signal (for instance, Vop) and coupled to said first and second RF-to-DC converter circuits (for instance, 12, 14); wherein said first RF-to-DC section comprises a number N of integer sub-stages, at least one sub-set of integer sub-stages in said number N of integer sub-stages being selectively deactivatable/activatable (for instance, Ns). The driver circuitry is configured to: i) perform a comparison (for instance, 212, 214) between said second converted signal and said voltage reference signal, wherein said comparison produces a first signal (for instance, Up) and a second signal (for instance, Dn), the first signal (Up) having a first value when said second converted signal is higher than said voltage reference signal and the second signal having a first value when said second converted signal is lower said voltage reference signal in order to check whether the second converted signal is within a range of values (for instance, Up, Dn) proportional to said voltage reference signal and ii) selectively deactivate (for instance, 21, cbs), respectively activate, a sub-set of integer sub-stages (for instance, Ns) in said number N of integer sub-stages of said first RF-to-DC section when said performed comparison has a first result, respectively a second result.

As exemplified herein, the first RF-to-DC circuit section may comprise a first voltage multiplier comprising a plurality of multiplication sub-stages (for instance, Ns), the first voltage multiplier having a unitary minimum multiplication factor and a maximum multiplication factor of N, wherein the multiplication factor may be varies selectively as a function of the integer number of multiplication substages activated in the range between unity and N.

As exemplified herein, said down-scaled replica of the first RF-to-DC section of the second RF-to-DC circuit section may have a scaling factor equal to two, providing a half-scaled replica of the first RF-to-DC section.

As exemplified herein, the driver circuitry may comprise a window comparator (for instance, 212, 214) coupled to the voltage reference generator and to the second RF-to-DC circuit section, the comparator being sensitive to the voltage reference signal received from the generator (200) and to the second signal from the second RF-to-DC circuit section.

As exemplified herein, the comparator may comprise a first (for instance, 212) and a second (for instance, 214) hysteresis comparators configured to change state at an upper end and a lower end of a hysteresis interval around said voltage reference signal, respectively.

As exemplified herein, said driver circuitry may comprise a finite state machine, FSM, circuit (for instance, 21) configured to receive said first signal and said second signal, the FSM circuit configured to produce and provide to said first RF-to-DC section 12 a control signal (for instance, cbs) configured to selectively activate, respectively deactivate, said sub-set of integer sub-stages in said number N of integer sub-stages of said first RF-to-DC section when said performed comparison has a first result, respectively a second result, the FSM circuit preferably comprising an asynchronous FSM circuit.

As exemplified herein, a system may comprise: at least one radiofrequency antenna (for instance, RX) configured to sense a RF signal (for instance, Vin); at least one circuit (for instance, 100) as exemplified herein, the circuit having said first RF-to-DC circuit section and said second RF-to-DC circuit section coupled (for instance, 11) to said at least one radiofrequency antenna to receive therefrom said first signal; and an electrical load (for instance, $Z_L$) coupled to the output node of the circuit (for instance, 10) to be supplied thereby.

As exemplified herein, the system may comprise a matching network (for instance, 11) configured to adaptively couple at least one radiofrequency antenna with said first RF-to-DC circuit section and said second RF-to-DC circuit section.

As exemplified herein, said electrical load may be an electrically powered sensor device.

As exemplified herein, a method (for instance, 21) of operating a circuit (100), comprises: performing a comparison (for instance, 212, 214) between said second converted signal (for instance, Vocs) and said voltage reference signal (for instance, Vop), wherein said comparison produces a first signal (for instance, Up) and a second signal (for instance, Dn), the first signal having a first value when said second converted signal is higher than said voltage reference signal and the second signal having a first value when said second converted signal is lower than said voltage reference signal in order to check whether the second converted signal is within a range of values (for instance, Up, Dn) proportional to said voltage reference signal; and selectively deactivating (for instance, 21, cbs), respectively activating, a sub-set of integer sub-stages (for instance, Ns) in said number N of integer sub-stages of said first RF-to-DC section when said performed comparison has a first result, respectively a second result.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

The claims are an integral part of the technical teaching provided herein with reference to the embodiments.

Without prejudice to the underlying principles, the details and embodiments may vary, even significantly, with respect to what has been described by way of example only, without departing from the extent of protection. The extent of protection is defined by the annexed claims.

The invention claimed is:

1. A circuit, comprising:
   a first radiofrequency-to-direct current (RF-to-DC) circuit configured to receive a first signal from at least one radiofrequency sensing antenna at a first node and produce a first converted signal at a second node;
   an energy storage circuit coupled to the first RF-to-DC circuit and supplied with the first converted signal;
   a second RF-to-DC circuit, wherein the second RF-to-DC circuit is a replica of the first RF-to-DC circuit scaled down by a scaling factor, configured to receive said first signal at an input node and produce a second converted signal at a sensing node that is indicative of an open-circuit voltage at the second node of the first RF-to-DC circuit;
   driver circuitry comprising a voltage reference generator configured to provide a voltage reference signal and coupled to said first and second RF-to-DC converter circuits;
   wherein said first RF-to-DC circuit comprises an integer number N of sub-stages, at least one sub-set of sub-stages in said number N being selectively deactivatable/activatable;
   wherein the driver circuitry is configured to:
   i) perform a comparison between said second converted signal and said voltage reference signal, wherein said comparison produces a first signal and a second signal, the first signal having a first value when said second converted signal is higher than said voltage reference signal and the second signal having a first value when said second converted signal is lower said voltage reference signal in order to check whether the second converted signal is within a range of values proportional to said voltage reference signal; and
   ii) selectively deactivate a sub-set of sub-stages in said number N of said first RF-to-DC circuit when said performed comparison has a first result, or selectively activate said sub-set of integer sub-stages in said number N of said first RF-to-DC circuit when said performed comparison has a second result.

2. The circuit of claim 1, wherein the first RF-to-DC circuit comprises a first voltage multiplier comprising a plurality of multiplication sub-stages, the first voltage multiplier having a minimum multiplication factor of unity and a maximum multiplication factor of N, wherein the multiplication factor may be varied selectively as a function of an integer number of multiplication sub-stages that are activated in the range between unity and N.

3. The circuit of claim 1, wherein said scaling factor is equal to two.

4. The circuit of claim 1, wherein the driver circuitry comprises a window comparator coupled to the voltage reference generator and to the second RF-to-DC circuit, the window comparator being sensitive to the voltage reference signal received from the generator and to the second converted signal from the second RF-to-DC circuit.

5. The circuit of claim 3, wherein the window comparator comprises a first hysteresis comparator and a second hysteresis comparator that are configured to change state at an upper end and a lower end, respectively, of a hysteresis interval around said voltage reference signal.

6. The circuit of claim 1, wherein said driver circuitry comprises a finite state machine (FSM) circuit configured to receive said first signal and said second signal, the FSM circuit configured to produce and provide to said first RF-to-DC circuit a control signal configured to selectively activate said sub-set of sub-stages in said number N when said performed comparison has the first result or selectively deactivate said sub-set of sub-stages in said number N when said performed comparison has the second result.

7. The circuit of claim 1, wherein said FSM circuit is an asynchronous FSM circuit.

8. The circuit of claim 1, further comprising an electrical load coupled to the output node of the first RF-to-DC circuit.

9. The circuit of claim 8, wherein said electrical load is an electrically powered sensor device.

10. The circuit of claim 1, further comprising a matching network configured to adaptively couple said at least one radiofrequency antenna to the first input of said first RF-to-DC circuit and to the input node of said second RF-to-DC circuit.

11. A circuit, comprising:
  a first radiofrequency-to-direct current (RF-to-DC) circuit configured to receive a radiofrequency signal at a first node and produce a first converted signal at a second node;
  an energy storage circuit coupled to receive the first converted signal from the second node;
  a second RF-to-DC circuit, wherein the second RF-to-DC circuit is a replica of the first RF-to-DC circuit scaled down by a scaling factor, configured to receive said radiofrequency signal at an input node and produce a second converted signal at a sensing node that is indicative of an open-circuit voltage at the second node of the first RF-to-DC circuit;
  wherein said first RF-to-DC circuit comprises an integer number N of multiplication stages, and wherein at least one sub-set of said multiplication stages is selectively deactivatable;
  a control circuit configured to:
    i) perform a comparison of said second converted signal to a reference voltage and assert a control signal when said second converted signal is higher than said reference voltage; and
    ii) selectively deactivate said sub-set of multiplication stages in response to assertion of control signal.

12. The circuit of claim 11, wherein said scaling factor is equal to two.

13. The circuit of claim 11, further comprising an electrical load coupled to the output node of the first RF-to-DC circuit.

14. The circuit of claim 13, wherein said electrical load is an electrically powered sensor device.

15. The circuit of claim 11, further comprising a matching network configured to adaptively couple said at least one radiofrequency antenna to the first input of said first RF-to-DC circuit and to the input node of said second RF-to-DC circuit.

16. A circuit, comprising:
  a first radiofrequency-to-direct current (RF-to-DC) circuit configured to receive a radiofrequency signal at a first node and produce a first converted signal at a second node;
  an energy storage circuit coupled to receive the first converted signal from the second node;
  a second RF-to-DC circuit, wherein the second RF-to-DC circuit is a replica of the first RF-to-DC circuit scaled down by a scaling factor, configured to receive said radiofrequency signal at an input node and produce a second converted signal at a sensing node that is indicative of an open-circuit voltage at the second node of the first RF-to-DC circuit;
  wherein said first RF-to-DC circuit comprises an integer number N of multiplication stages, and wherein at least one sub-set of said multiplication stages is selectively activatable;
  a control circuit configured to:
    i) perform a comparison of said second converted signal to a reference voltage and assert a control signal when said second converted signal is higher than said reference voltage; and
    ii) selectively activate said sub-set of multiplication stages in response to assertion of control signal.

17. The circuit of claim 16, wherein said scaling factor is equal to two.

18. The circuit of claim 16, further comprising an electrical load coupled to the output node of the first RF-to-DC circuit.

19. The circuit of claim 18, wherein said electrical load is an electrically powered sensor device.

20. The circuit of claim 16, further comprising a matching network configured to adaptively couple said at least one radiofrequency antenna to the first input of said first RF-to-DC circuit and to the input node of said second RF-to-DC circuit.

* * * * *